March 27, 1962 W. C. SMITH 3,026,877
PEA SHELLER

Filed Sept. 10, 1959 2 Sheets-Sheet 1

INVENTOR
WILLARD C. SMITH

BY John Gibson Semmes

ATTORNEY

March 27, 1962 W. C. SMITH 3,026,877
PEA SHELLER

Filed Sept. 10, 1959 2 Sheets-Sheet 2

INVENTOR
WILLARD C. SMITH
BY John Gibson Semmes
ATTORNEY

United States Patent Office 3,026,877
Patented Mar. 27, 1962

3,026,877
PEA SHELLER
Willard C. Smith, P.O. Box 858, Dade City, Fla.
Filed Sept. 10, 1959, Ser. No. 839,147
2 Claims. (Cl. 130—30)

The present invention relates to means for removing peas and related edible seeds from dehiscent pods.

Among the problems involved in extracting green peas and the like from hulls is that the latter must be partially dry before shelling can be undertaken. Additionally, canners find it difficult to shell half-grown peas through existing equipment, due to failure of the equipment to clean itself during operation. Existing "shellers" are ineffective in cleaning membranous pulp and hulls from the unit resulting in pod slippage, jamming and poor seed removal.

Problems in the prior art involve incorrect spacing as between rollers per se and between rollers and platforms resulting in mashing the hulls before pulling same through or otherwise failing to pull the hull through due to excessive spacing as between the respective rollers used. Additionally, the art is such that manual selection as between blossom or stem end of the pod is required before operation.

With these and other problems in mind, the following are objectives of invention:

It is an object of this invention to provide automatic means for removing peas and like seeds from their natural pods.

It is a further objective of invention to provide a unique apparatus for effecting the removal of peas and like seeds from pods in which said apparatus is self-cleaning, thereby insuring continuous usage over extended periods of time.

In apparatus for the removal of peas and like seeds from pods in their natural state, means for effectively adjusting self-cleaning and feeding units relative to the roller system.

Another objective of invention is to provide in the separation of peas and like seeds from dehiscent pods not only means for shielding the operator from random throwing, scattering and the like, but also efficient scraper means in conjunction with counter rotating rollers to insure continuous and effective operation, irrespective of the period of usage of the device.

Yet another objective of invention is to provide unique scraper and pod engaging roller system whereby serrated portions of the rollers cooperate with carefully disposed scraper units to effect continuous cleansing of the former during operation, thereby to insure continuous operation despite liquidity and freshness of the product or other factors.

Figure 1:
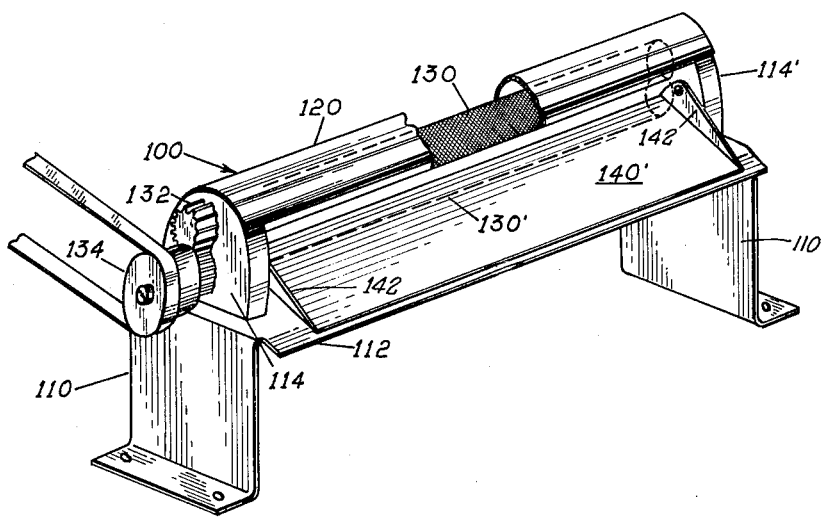
FIG. 1 is an isometric view of invention showing drive means.
Figure 2:
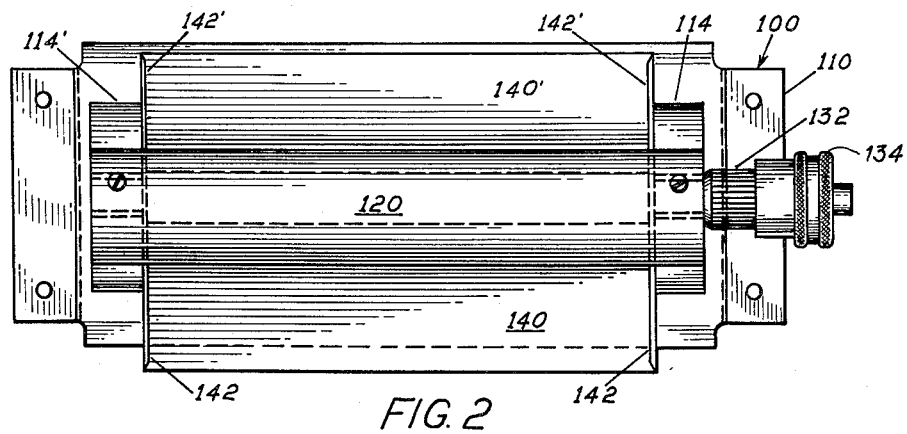
FIG. 2 is a top plan view thereof.
Figure 4:
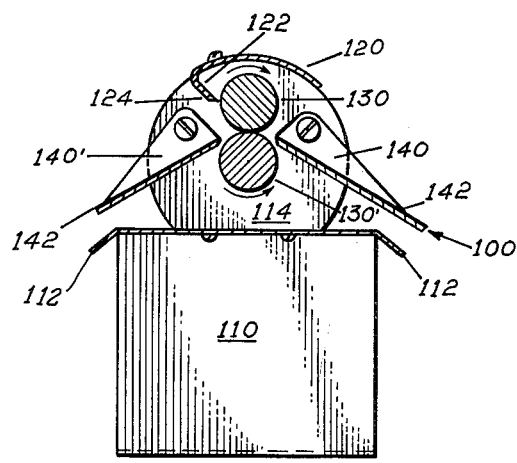
FIG. 4 is a vertical sectional view thereof taken along the lines 4—4 of FIG. 3.

In FIG. 1 it will be noted that the device comprises a unit 100 mounted on uprights 110 said uprights being joined by a transverse platform having depending flanges on forward and rearward portions thereof, said flanges being identified as 112 (FIG. 4). Journals 114 and 114' are secured to the transverse platform by suitable means, these journals providing bearings for the respective rollers 130' and 130 and their corresponding driving and driven gears 132' and 132 respectively.

Figure 3:
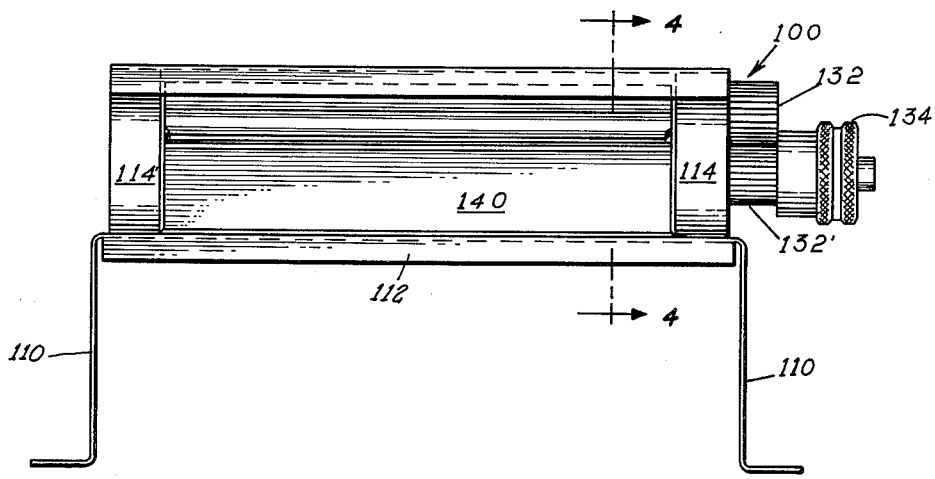
FIG. 3 is a side elevation view of the invention.

Referring to FIG. 3 it will be noted that the driving gear 132' is driven by sheave 134, said gear 132' being aligned axially with its corresponding roller 130' and adapted through gear contact to rotate idler gear 132. The idler 132 is in turn disposed in axial alignment with the corresponding counter rotating roller 130.

The dimension and exterior surface of the respective rollers 130 and 130' is critical when one considers the disposition of the respective scraper 122, feeding unit 140 and discharge scraper 140'. Both rollers 130 and 130' are knurled, the knurling being illustrated by continuous cross-hatching throughout the exposed surface of the respective rollers as shown in fragment in FIG. 1. In practice, it has been found that the rollers when made from stock of ⅞ of an inch in diameter and reduced 0.015 inch respectively in diameter, knurled and thereupon mounted with their axes at ⅞ inch from one another, thus leaving 0.030 inch space between opposed rollers, a satisfactory device may thus be constructed. In the shelling of peas if the rollers are spaced too great a distance, the pod brought into contact with the rollers will not pass its hull through; whereas on the other hand, if the rollers are spaced too close together or in contact with one another, both pod and seed will be crushed, before effectively separating the hull from seed.

In a unit of these dimensions, it has been found most effective to construct same at 8 inches of working surface as between rollers. Thus, the effective working surface of the rollers is approximately 8 inches axially, this being substantially the same as the distance between upright flanges 142 of the feeding unit 140 and scraping unit 140'.

In the rearward portion of the device, as best shown in FIG. 4, there are two scrapers. The first is scraper 122, this being an integral portion of the cover 120. Scraper 122 has a knife-like edge 124 extending longitudinally of its corresponding roller 130, this scraper being adapted to remove the liquid and mashed hull interior from the roller which moves in a clockwise direction. It will be noted that the knife-like edge 124 of this scraper is bevelled exteriorly or on its lower edge. The position of this scraper is substantially stationary with respect to its corresponding roller 130.

Referring however to opposed scraping unit 140' is an adjustable scraper being pivoted upon setscrews 146 as shown. The extremity closest to corresponding roller 130' is bevelled on the bottom surface which is immediately adjacent roller 130'. This roller 130' is adapted to rotate counter-clockwise.

The corresponding feeder plate 140 is pivoted upon setscrews 148 and although provided with a bevelled surface adjacent roller 130' (said bevelled surface being on the lower portion of the plate 140 at its inner end) does not serve as a scraper per se, due to the fact that the roller 130' is rotating away from the end of the plate 140, in a counter-clockwise direction and toward the opposed bottom bevelled surface of the element 140'.

In operation, this platform 140 having guide flanges 142 serves as a feed platform in which the operator places a batch of pods containing the peas, either blossom end or tendril end with the platform being pivoted so that plate 140 feeds the end of the pea immediately between the respective rollers 130 and 130'. Feeding the peas by blossom end, however, is preferred as this end of the pod is somewhat sharper than the tendril end. As the rollers are adapted to rotate at approximately 100 r.p.m. the pod pops open at its dehiscent edge or seam and the pod is thus spread apart so that each half thereof is spread apart flatwise to pass the hull through the rollers as the peas roll out, fall down the guide platform 140 into a suitable receptacle.

The curvilinear disposition of shield 120 is such as to prevent excessive scattering of the more liquid and membranous material which may be thrown about by the centrifugal action of the rollers or by the gathering thereof at the feed face of the counter rotating rollers during operation.

It will be noted that both opposed platforms 140 and 140' are adjustable pivoted by means of setscrews 148 and 146, respectively, with respect to the roller 130 and its counterpart 130'. In operation, it is most desirable to have the scraper end of the platform 140' immediately adjacent the surface of roller 130' which counter rotates against the scraper end for scraping action. The serrated or knurled portion of the respective rollers is uniform and such as to prevent jamming of the rollers against their respective scrapers 122 and 140' and the bevelled surfaces of the respective scrapers being both on the lower side, effectively cleans the rollers before they return to the feed station adjacent platform 140. Noteworthy is the fact that the rollers are counter rotating to effect the desired function.

The respective platforms 140 although of similar width, and 140' are disproportionate in length, the former being longer than the latter. The latter is of a sufficient depth as to insure that the waste is forcibly ejected from the unit 110 and the former is of a depth which will satisfactorily accommodate lengthwise side by side introduction of the pods.

I claim:

1. A device for removing seeds from dehiscent pods of vegetables comprising opposed upper and lower rollers spaced from one another a distance slightly less than the average thickness of the pods and serrated in the form of criss-cross knurlings, a pod feed platform adjustable about a pivot parallel to the axis of the opposed rollers, said platform being arcuately positionable with respect to the spacing between opposed rollers, pod discharge means rearwardly adjacent the roller and adjustable about a pivot which is parallel to the axis of the roller, an end of said discharge means being arcuately movable into and out of scraping contact with the lower roller, said end being bevelled on its bottom edge adjacent the lower roller, a scraper adjacent the upper roller including a cover means encompassing partially said upper roller and means connected to said rollers for effecting counter-rotational movement to said rollers, said cover being above the upper roller and curved rearwardly upon itself, forming an axially aligned scraper for said upper roller, the free end of the cover being curvilinear so as to provide a shield to confine dehulled peas and waste to the device.

2. A device as in claim 1, said spacing being .030 inch.

References Cited in the file of this patent

UNITED STATES PATENTS

| | | |
|---|---|---|
| 489,929 | Clark et al. | Jan. 17, 1893 |
| 1,572,867 | Sabell | Feb. 9, 1926 |
| 1,704,427 | Coggins | Mar. 5, 1929 |
| 1,906,598 | Hoe | May 2, 1933 |
| 2,820,459 | Russell | Jan. 21, 1958 |

FOREIGN PATENTS

| | | |
|---|---|---|
| 1,081,627 | France | June 2, 1954 |